(12) United States Patent
Hu

(10) Patent No.: US 7,027,578 B2
(45) Date of Patent: Apr. 11, 2006

(54) CALL-BACK NUMBER VOICE CAPTURE METHOD AND APPARATUS

(75) Inventor: Gilbert Hu, Fremont, CA (US)

(73) Assignee: Altigen Communication, Fremont, CA (US)

( * ) Notice: Subject to any disclaimer, the term of this patent is extended or adjusted under 35 U.S.C. 154(b) by 11 days.

(21) Appl. No.: 10/818,710

(22) Filed: Apr. 5, 2004

(65) Prior Publication Data

US 2004/0264667 A1 Dec. 30, 2004

Related U.S. Application Data

(63) Continuation of application No. 10/093,003, filed on Mar. 5, 2002, now Pat. No. 6,738,465, which is a continuation of application No. 09/255,358, filed on Feb. 23, 1999, now abandoned.

(60) Provisional application No. 60/115,879, filed on Jan. 13, 1999.

(51) Int. Cl.
*H04M 3/42* (2006.01)

(52) U.S. Cl. .............................. 379/210.01; 379/88.01; 379/88.18; 379/88.21; 379/88.25; 379/88.26

(58) Field of Classification Search ............. 379/88.01, 379/88.18, 88.21, 88.25, 88.26, 210.01
See application file for complete search history.

(56) References Cited

U.S. PATENT DOCUMENTS

| 5,146,487 | A | 9/1992 | Bergsman et al. |
| 5,155,761 | A | 10/1992 | Hammond |
| 5,185,782 | A | 2/1993 | Srinivasan |
| 5,311,574 | A | 5/1994 | Livanos |
| 5,627,884 | A | 5/1997 | Williams et al. |
| 5,651,056 | A | 7/1997 | Eting et al. |
| 5,832,060 | A | 11/1998 | Corlett et al. |
| 5,943,397 | A | 8/1999 | Gabin et al. |
| 6,192,119 | B1 | 2/2001 | Wilson |
| 6,195,418 | B1 | 2/2001 | Ridgley |
| 6,738,465 | B1 | 5/2004 | Hu |

*Primary Examiner*—Bing Q. Bui
(74) *Attorney, Agent, or Firm*—Townsend and Townsend and Crew LLP

(57) ABSTRACT

A method for operating a telephone server includes receiving an incoming call from a first user for a second user at a telephone extension, prompting the first user to speak a message, receiving a spoken message from the first user, receiving a spoken telephone call-back number from the first user, recognizing a numeric telephone call-back number in response to the spoken telephone call-back number, associating the numeric telephone call-back number with the spoken message, and storing the spoken message and the numeric telephone call-back number in a memory.

21 Claims, 6 Drawing Sheets

CALL-BACK NUMBER VOICE CAPTURE METHOD AND APPARATUS

CROSS-REFERENCES TO RELATED APPLICATIONS

The present invention disclosure is a continuation application of U.S. application Ser. No. 10/093,003 filed on Mar. 5, 2002 (now U.S. Pat. No. 6,738,465 B1) which is a continuation application of U.S. application Ser. No. 09/255,358 filed on Feb. 23, 1999 (abandoned) which claims priority from U.S. Provisional Application No. 60/115,879 filed Jan. 13, 1999, entitled "Telephone Server Method and Apparatus." These applications are herein by incorporated by reference for all purposes.

BACKGROUND OF THE INVENTION

The present invention relates to computer telephony. More specifically, the present invention relates to telephone and telecommunication servers for storing and returning messages.

Offices today share many modern conveniences, such as fax machines, electronic mail, commonly known as e-mail, high-powered computers, voice mail, and the like. Offices also share many of the same inconveniences, such as jammed copy machines, broken computers, and even disheveled piles of paper having scribbled telephone numbers. Often, just who the telephone number actually calls has long been forgotten, but typically the scraps are not thrown away, "just in case" the numbers are still needed.

These scraps of papers are commonly a byproduct of voice mail systems. In particular, when users retrieve their voice mail messages, the caller leaves a message and a number they can be reached at, also known as a call-back number. So the user can return the call, she typically scribbles the call-back number on an envelope, an unrelated piece of paper, a sticky pad, and the like. Later, when convenient, the user can return the caller's call. As noted above, when the user has a great number of messages to return, these scraps of paper can get shuffled around and even lost. As a result, the user may not be able to return the message. Even if the user can find the number, she must dial it over and over, if there is no answer.

One of the recent solutions to reduce the need for voice mail users to write down call-back numbers left in their mail boxes has been use of user or caller call-back technology. One of the pioneering companies in the area of call-back technology has been AltiGen Communications, the assignee of the present invention. With call-back functionality, the caller is prompted to enter her call-back number by way of pressing keys on her telephone keypad, which in turn generates well known DTMF tones. These DTMF tones are then recorded into the voice mail system. Later when the owner of the mail box reviews the message, she can direct the voice mail system to dial the same DTMF tones to return the caller's message.

Drawbacks to having callers leave call-back telephone numbers include that it required the caller to enter their call-back telephone number in a manner different from the way the caller would leave a message. For example, the caller would leave a voice message, and then enter a call-back telephone number with a numeric keypad. This way of providing call-back service was potentially dangerous for the caller, for example, if the caller were driving on crowded expressway. In such a case, the caller would have to first fumble for the telephone, take her eyes off traffic to make sure the phone was in the proper position, and while looking at the telephone keypad press a series of keys. Other such drawbacks could also be envisioned.

Thus, in light of the above, what is needed in the industry are improved methods and apparatus for providing improved methods and apparatus for capturing telephone call-back numbers.

SUMMARY OF THE INVENTION

The present invention relates to methods and apparatus for improved telephone messaging. In particular, the present invention relates to capturing telephone call-back numbers using novel methods and apparatus.

According to an embodiment of the present invention, a method for operating a telephone server includes receiving an incoming call from a first user for a second user at a telephone extension, prompting the first user to speak a message, and receiving a spoken message from the first user. The method also includes receiving a spoken telephone call-back number from the first user, recognizing a numeric telephone call-back number in response to the spoken telephone call-back number, associating the numeric telephone call-back number with the spoken message, and storing the spoken message and the numeric telephone call-back number in a memory.

According to another embodiment, a computer program product for operating a telephone server including a processor includes code that directs the processor to detect an incoming call from a first user for a second user at a telephone extension, code that directs the processor to prompt the first user to speak a telephone call-back number, code that directs the processor to receive the telephone call-back number from the first user, and code that directs the processor to recognize a numeric telephone call-back number in response to the telephone call-back number. Code that directs the processor to prompt the first user to speak a message, code that directs the processor to receive the message from the first user, code that directs the processor to associate the numeric telephone call-back number with the message, and code that directs the processor to store the message and the numeric telephone call-back number in a computer memory are also provided. The codes are stored in a computer readable media.

According to yet another embodiment, a telephone server including a processor, for providing telephone call-back numbers includes a computer readable memory. The computer readable media includes code that directs the processor to detect an incoming call from a first user for a second user at a telephone extension, code that directs the processor to detect whether the telephone extension has been answered, and code that directs the processor to prompt the first user to input a spoken call-back number when the processor detects the telephone extension has not been answered. Code that directs the processor to receive the spoken call-back number from the first user, code that directs the processor to prompt the first user to input a spoken message when the processor detects the telephone extension has not been answered, and code that directs the processor to receive the spoken message from the first user are also provided. The computer readable memory also includes code that directs the processor to recognize numbers for a call-back number from the spoken call-back number, code that directs the processor to associate the call-back number with the spoken message, and code that directs the processor to store the spoken message and the call-back number in a computer memory.

BRIEF DESCRIPTION OF THE DRAWINGS

In order to more fully understand the present invention, reference is made to the accompanying drawings. Understanding that these drawings are not to be considered limitations in the scope of the invention, the presently preferred embodiments and the presently understood best mode of the invention are described with additional detail through use of the accompanying drawings in which.

DESCRIPTION OF THE SPECIFIC EMBODIMENTS

System Overview

Figure 1:
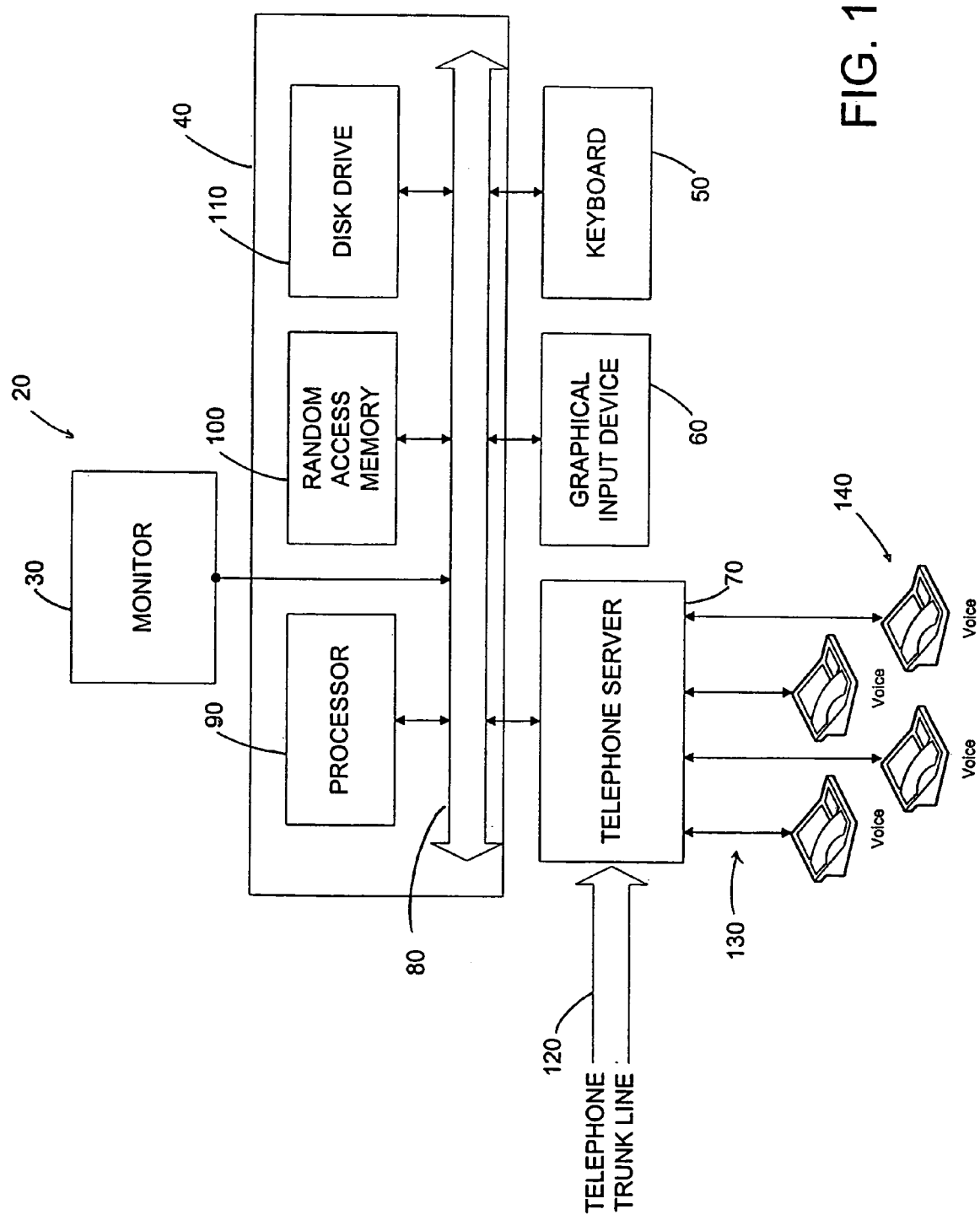
FIG. 1 is a block diagram of a computer telephony system according to a preferred embodiment of the present invention.

FIG. 1 is a block diagram of a computer telephony system 20 according to a preferred embodiment of the present invention. Computer telephony system 20 includes a monitor 30, a computer 40, a keyboard 50, a graphical input device 60, and a telephone server 70. Computer 40 includes familiar computer components such as a processor 90, and memory storage devices, such as a random access memory (RAM) 100, a disk drive 110, and a system bus 80 interconnecting the above components. A telephone trunk line 120 and individual telephone lines 130 are coupled to telephone server 70. Handsets 140, (also telephones or telephone handsets) may be coupled to individual telephone lines 130.

Handsets 140 are preferably analog signal telephone handsets, however alternatively they may be any well known type of digital or analog telephone handset. A mouse is but one example of an input device 370, also known as a pointing device. Other types of input devices may include trackballs, drawing tablets, microphones (for voice activated input), and the like. Computer telephony system 20 may be coupled to a computer network through use of a network interface, not shown, such as an Ethernet card, a modem, and the like.

RAM 100 and disk drive 110 are examples of tangible media for storage of data, message files, computer programs, drivers for the telephone server, embodiments of the herein described methods, and the like. Other types of tangible media include floppy disks, removable hard disks, optical storage media such as CD-ROMS and bar codes, and semiconductor memories such as flash memories, read-only-memories (ROMS), and battery-backed volatile memories.

In a preferred embodiment, computer telephony system 20 includes an IBM PC compatible computer having '586 or '686 class based microprocessors, such Pentium® or PentiumII® microprocessors from Intel Corporation. Further, in the present embodiment, computer telephony system 20 operates utilizing the WindowsNT® operating from Microsoft Corporation, to run AltiWareOE® software from AltiGen Communications, Inc. Telephone server 70 is preferably embodied as a Quantum® PCI based plug-in expansion board from AltiGen Communications, Inc.

FIG. 1 is representative of but one type of system for embodying the present invention. It will be readily apparent to one of ordinary skill in the art that many system types of hardware and software configurations are suitable for use in conjunction with the present invention. For example, any computer communications bus may be used with alternative embodiments of the present invention, further computer telephony system 20 may operate under the LINUX operating system, may be ported onto a PowerPC G3 or G4 class microprocessor computer running MAC OS 8.5 from Apple Computer Corporation, and the like.

Hardware Description

Figure 2:
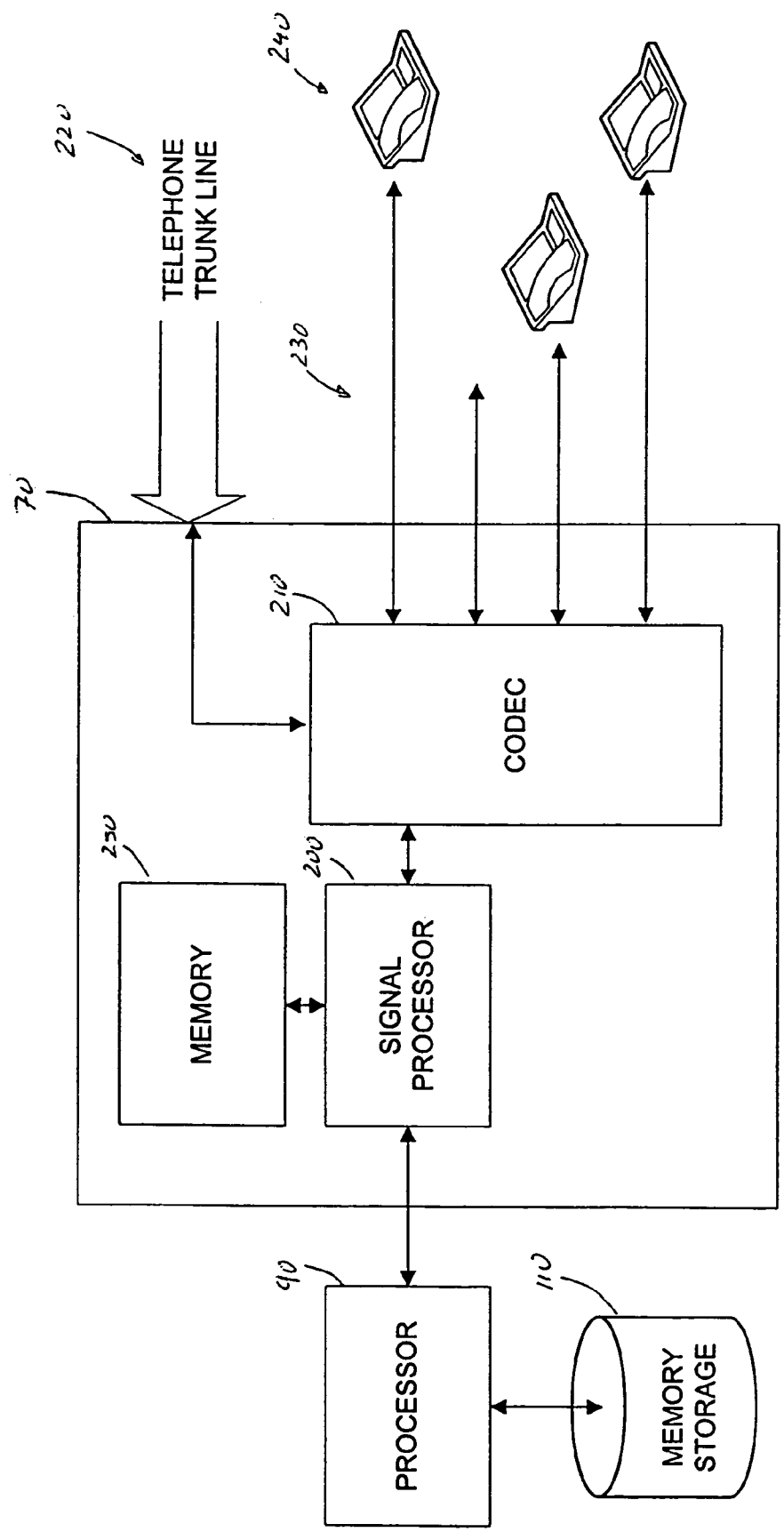
FIG. 2 is a more detailed block diagram of a portion of a computer telephony system according to an embodiment of the present invention.

FIG. 2 is a more detailed block diagram of a portion of a messaging system according to an embodiment of the present invention. FIG. 2 illustrates processor 90, disk drive 110, and telephone server 70. In the present embodiment, telephone server 70 includes a signal processor 200, a digital to analog and analog to digital coder (CODEC) 210, and a memory 250. Telephone server 70 interfaces with telephone trunk lines 220 and with telephone extension lines 230. In turn, telephone extension lines 230 are coupled to telephone handsets 240.

In the present embodiment, memory storage 110 is used to store audio messages, such as voice messages, numeric telephone numbers, caller databases, voice prompt files, and the like, as will be described later.

In FIG. 2, processor 90 is used to control the operation of telephone server 70 according to instructions from the AltiWare® software previously described. In one embodiment of the present invention, AltiWare® software, operates in a multi-threaded multi-tasking environment, where each thread monitors the status of a particular telephone extension line 230. The status of the particular telephone extension line is typically represented as a state machine in the software.

In the present embodiment, processor 90 is also used to convert incoming audio messages to message files in a storage format, and to convert message files and voice prompt files from the storage format to an output format (typically digital signals). In the present embodiment, two specific storage formats could be used for audio messages and include the well-known ".wav" file format, and a pulse coded modulation scheme (PCM).

In other embodiments of the present invention, a single storage format may be used. In other embodiments, other formats for storage of audio messages and the like are known to those of ordinary skill in the art and can be used. For example, formats such as the "RealAudio" format, MP3, and the like may be also be used in embodiments of the present invention.

Signal processor 200 is embodied as a Texas Instruments TMS320C5X digital signal processor (DSPs), and is coupled to receive instructions, data, and the like from processor 90. Memory 250 is used to store local instructions, a voice recognition algorithm, discussed below, data for signal processor 200, and the like. Of course DSPs from other manufacturers may be used in other embodiments of the present invention.

In the present embodiment, signal processor 200 provides telephone switching functionality to each telephone extension line. For example, in this embodiment, signal processor 200 is used to detect off-hook conditions, to provide tone generation, to detect and process key-pad (DTMF) tones generated from each telephone handset 240, to connect incoming telephone calls to appropriate extensions, and the like.

Signal processor 200 is also used to provide messaging functionality, such as an implementation of a voice mail system. In particular, signal processor 200 outputs instructions, user prompts, messages, and the like, to the messaging user. Further, signal processor 200 receives function selections in the form of DTMF tones, spoken instructions, and the like from the messaging user. As discussed above, memory storage 110 may be used to store data associated with the messaging functionality, such as voice prompts, the incoming messages, outgoing messages, and the like.

Signal processor 200 is also used to convert or "recognize" particular incoming audio messages and translate the messages into a computer recognizable form. For example, signal processor 200 can recognize the spoken words "three, two, one" as the numeric number "3,2,1", e.g. ASCII character equivalents. As another example, signal processor 200 can recognize the spoken word "yes" or "ok" as an affirmative response, and "no" as a negative response.

In the present embodiment, signal processor 200 can use any conventional voice recognition. In alternative embodiments, other conventional voice recognition algorithms may also be used, as the voice recognition demands upon signal processor 200 are typically constrained. In embodiments destined for non-English speaking countries, voice recognition algorithms specific to the native languages may be used.

In an alternative embodiment of the present invention, processor 90 may be used to perform the voice recognition process instead of signal processor 200. In still another embodiment, the voice recognition process may be split between processor 90 and signal processor 200.

Signal processor 200 typically comprises a multi-process environment wherein each process monitors the off-hook and the messaging the status of a particular telephone extension line 230. The status of the particular telephone extension line in off-hook mode or in the messaging mode is represented as respective state machines within signal processor 200. In one embodiment of the present invention, signal processor 200 can process up to twelve telephone extension lines being simultaneously in off-hook mode or in messaging mode. In alternative embodiments, monitoring of states of a greater or fewer number of telephone extension lines 230 is contemplated.

As illustrated in FIG. 2, CODEC 210 is used to provide an interface between users on telephone extension lines 230 and signal processor 200. In the present embodiment, CODEC 210 digitizes analog messages and analog signals from users on telephone extension lines 230. Codec 210 also converts digital signals from signal processor 200, processor 90, and the like, into analog signals for users on telephone extension lines 230. In the present embodiment, the analog signals include audio messages to and from users, dial tone and multifunction (DTMF) tones, and the like. The analog signals also include voice prompts or phrases that provide voice prompting capability to users on telephone extension lines 230 and messages recorded by users. Examples of voice prompts or phrases, include messages that instruct the user which keys on a telephone to select to perform particular functions, messages that tell the user how many messages are pending, requests for instructions, requests user input, and the like.

Figure 3A:
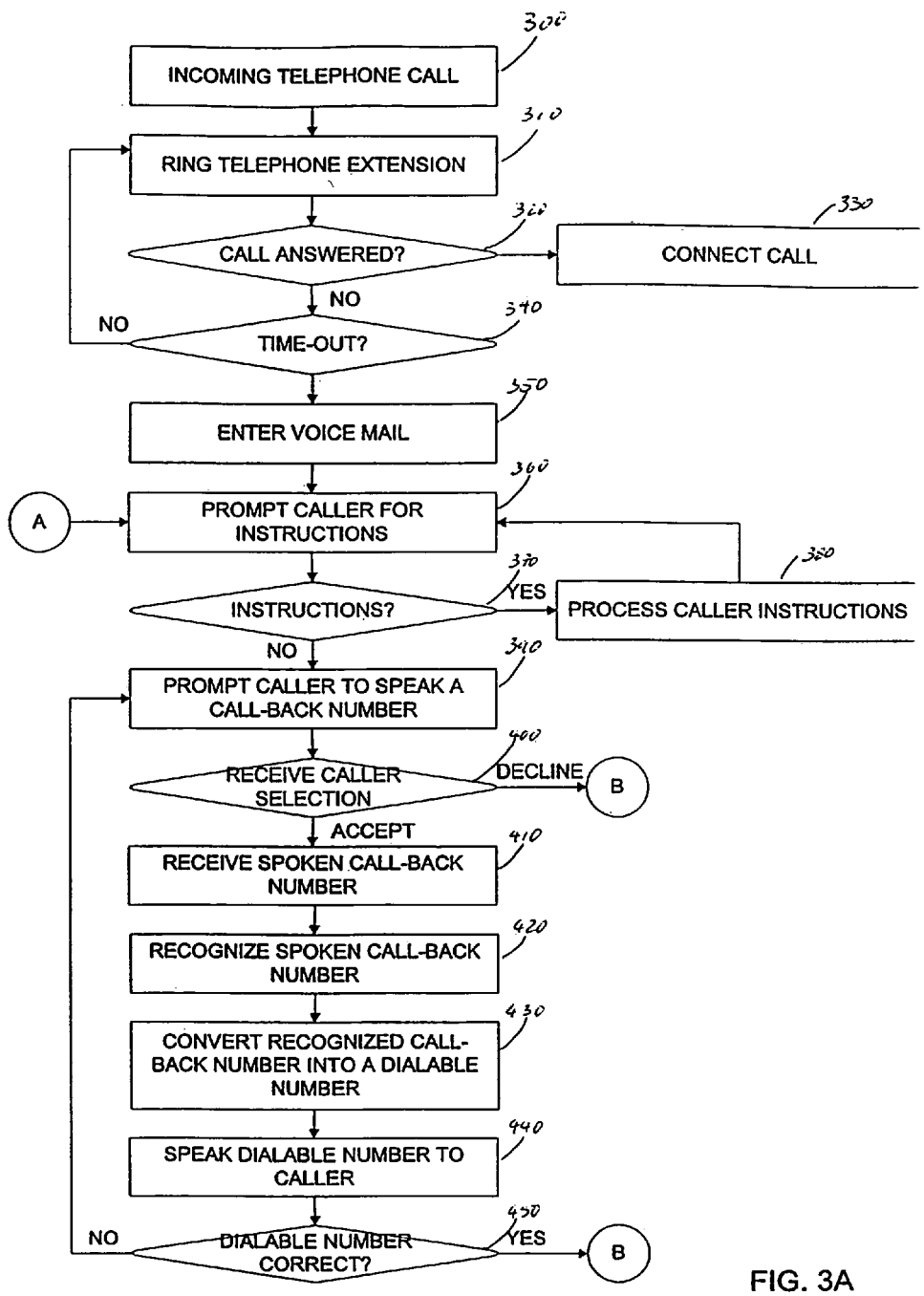
FIGS. 3A and 3B illustrate flow diagrams of an embodiment of the present invention.
Figure 3B:
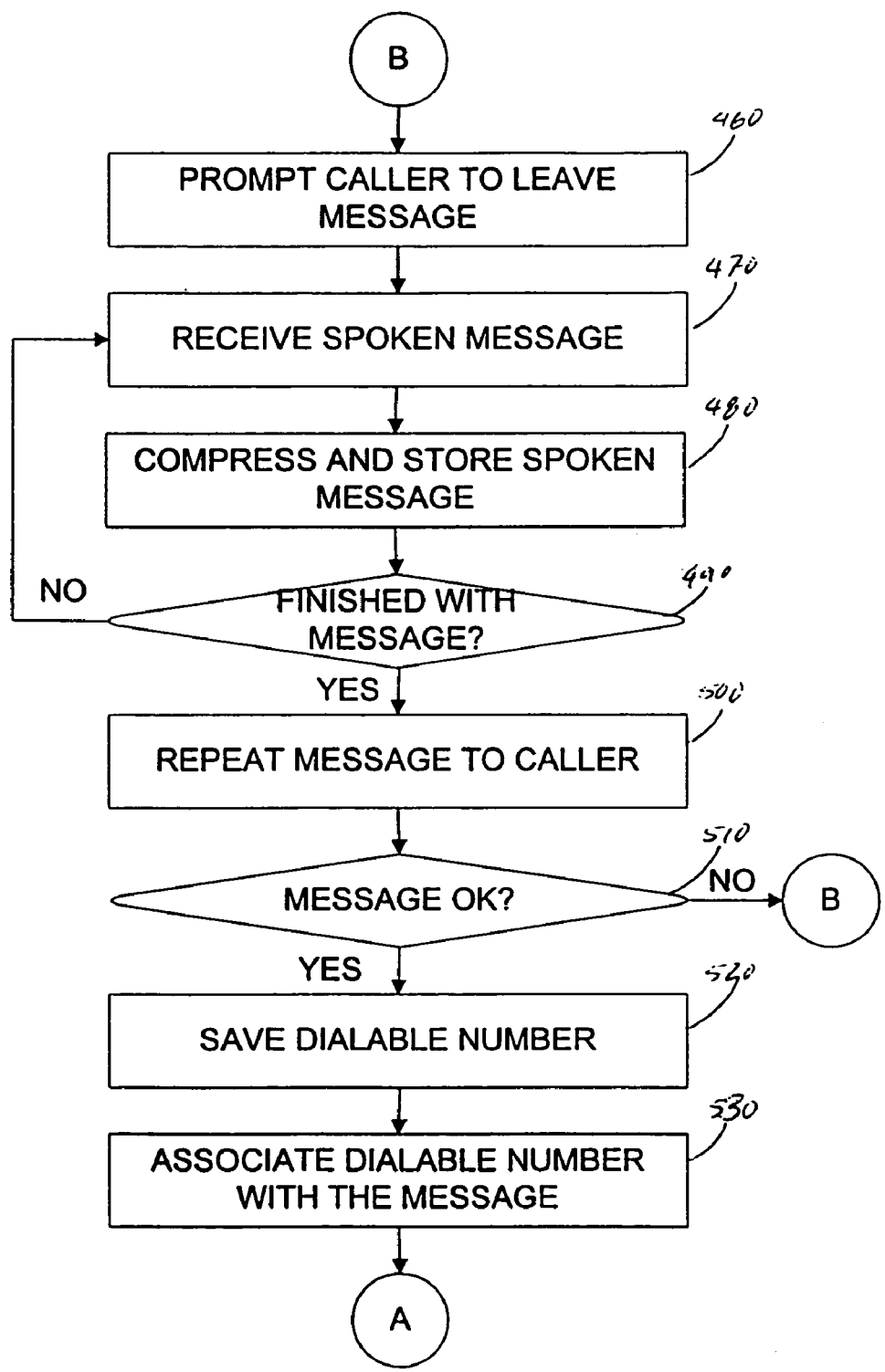

FIGS. 3A and 3B illustrate flowcharts of an embodiment of the present invention.

Initially an incoming telephone call arrives for a particular telephone extension line, step 300. The incoming call is typically an internal telephone call from another telephone extension line 230 or an external telephone call from telephone trunk 220.

In response to the incoming telephone call, signal processor 200 sends ringing signals to the particular telephone extension, step 310. If the particular telephone extension is answered, step 320, the incoming telephone call is connected to the particular extension, step 330. If the particular telephone extension is not answered within a predetermined amount of time, step 340, the incoming call is transferred to a messaging state machine (a voice mail), step 350. In the present embodiment, the voice mail is treated as a typical internal telephone extension line and rings at least once before the incoming call is answered.

Initially, the voice mail system outputs instructions to the caller and typically prompts to the caller for instructions, step 360. Instructions to the caller typically include how to leave a message, how to transfer to an operator, how to bypass the instructions menu, and the like. If the caller inputs instructions, step 370, the instructions are processed by the voice mail system, step 380. In the present embodiment, instructions take the form of DTMF tones in response to the caller pressing buttons on a numeric keypad. In alternative embodiments, other forms of caller input may include spoken instructions, and the like.

In the present embodiment, in a default mode, if no instructions are received from the caller, a message instructing the caller to say a call-back number is output, step 390. Typically, the call-back number is a telephone number that the caller leaves in the voice mail system. This telephone number may be the number the caller is calling from; if the caller is expecting to be out of the office, the caller's cell phone number, the caller's pager number, the caller's home number, and the like; the telephone number of the party more appropriate for the telephone call, e.g. a sales office returning a telephone call meant for a service department; and the like.

If the caller does not want to leave a call-back number, the caller may decline leaving a number, step 400.

Next, the caller says the call-back number, step 410. The call-back number may be in any appropriate form, for example: "five ten area code, TAngo, four, one, two, two, two"; "one, zero, two, eleven, eighteen"; "one, eight-hundred, A, L, T, I, G, E, N", and the like. In response to the call-back number spoken by the caller, the numeric translation of the telephone number is determined, step 420.

In the present embodiment, conventional voice recognition algorithms can be utilized to recognize the spoken words or characters. The recognized words or characters typically include ASCII characters or words. For example, using the examples above, the recognized words or characters recognized are "510 area code tango 41122"; "1021118"; "1800ALTIGEN".

In other embodiments of the present invention, voice recognition algorithms can be used to provide recognition of speech in languages other than standard American English. Further, in other embodiments, multiple language voice recognition algorithms can be used to support voice recognition in multi-lingual environments.

Next, the recognized words or characters are translated into a dialable telephone number, step 430. For example, if telephone server 70 determines that the call-back number is in the same area code as telephone server 70, the area code may be truncated from the call-back number. As another example, based upon the area code of the caller, as determined by conventional Caller ID codes, telephone server 70 may determine that an area code should be prepended to the call-back number. As still another example, telephone server 70 may determine that a number, such as a one, should be prepended to the call-back number. In another example, letters may be translated to numbers, for example, "510 area code TAngo 41122" would could become "8241122", and "1800ALTIGEN" would become "18002584436."

In alternative embodiments of the present invention, conventions for telephone numbers for other countries may be used to correctly translate the recognized words or characters into dialable telephone numbers.

After the dialable telephone number has been determined, the dialable telephone number is typically repeated to the caller, step 440. In the present embodiment, this typically includes the step of translating each number in the dialable number into a spoken number. For example, "8241122" would be read to the caller as "eight, two, four, one, one, two, two."

In the present embodiment, voice files from memory storage 110 are retrieved by processor 90 and played to the caller. As noted above, these voice files may be in the form of a ".WAV" format or other conventional format such as a pulse-coded modulation scheme. In alternative embodiments of the present invention, the language of the speech contained in the voice files may be changed depending on the language requirements of the caller. For example, the telephone number read back to the caller may be in French, Chinese, Japanese, or the like.

If the dialable telephone number has not been correctly captured by telephone server 70, step 450, the above capture process may be repeated, if desired. If the caller is satisfied with the dialable telephone number, the caller is typically prompted to leave a voice mail message, step 460.

Next, telephone server 70 then receives the desired message, step 470. In other embodiments of the present invention, the message need not be a voice message, and may be a facsimile transmission, a data transmission, and the like.

In the present embodiment, the message is compressed using a conventional pulse coded modulation scheme, and then stored into memory storage 110, step 480. In alternative embodiments other types of compression schemes may be used to advantageously reduce the amount of data required by a message, although simple ".wav"-type formats can also be used.

Typically telephone server 70 stops recording when telephone server 70 determines that the caller has hung up or when the caller presses a particular telephone keypad key or combinations of keys, step 490. In the present embodiment, if the caller has not terminated the call, the caller can review the message before sending the message, step 500. The caller may then re-record the message or accept the message, step 510. When the message is accepted, the dialable telephone number is saved, step 520, and the message becomes associated with the dialable telephone number, step 530.

In the present embodiment, when the "owner" of the particular telephone extension calls the messaging system, the message can be played back to the owner in a conventional manner. Further, if a dialable telephone number has been associated with the message, the messaging system prompts the owner whether to make a call to the associated dialable telephone number. When the owner indicates she wants to return the call, the messaging server dials the dialable telephone number left by the caller. By doing this, the owner need not write down the call-back number and need not dial the call-back number herself.

In alternative embodiments of the present invention, instead of the dialable number being repeated to the caller in step 440, above, the recognized words or characters are repeated to the caller. For example for the telephone number "1-800-A-L-T-I-G-E-N" telephone server 70 would say the words "one eight hundred A L T I G E N" instead of the words "one eight zero zero two five eight four four three six." Such embodiments may reduce caller confusion as to the call-back number entered, especially if significant changes to the number are made. For example, adding dialing prefixes, converting letters to numbers, illustrated above, adding an area code, and the like.

Figure 4A:
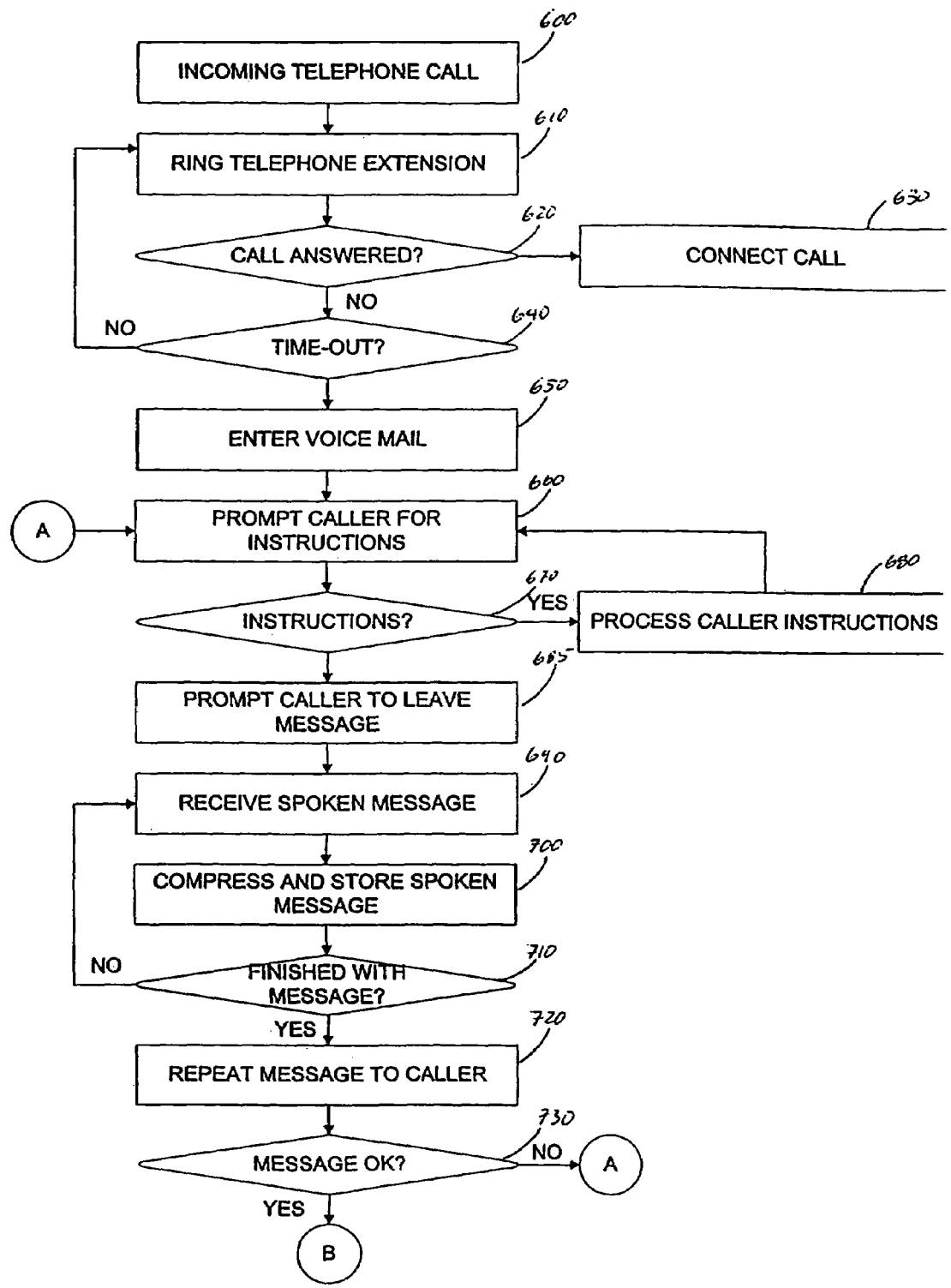
FIGS. 4A and 4B illustrate flow diagrams of another embodiment of the present invention.
Figure 4B:
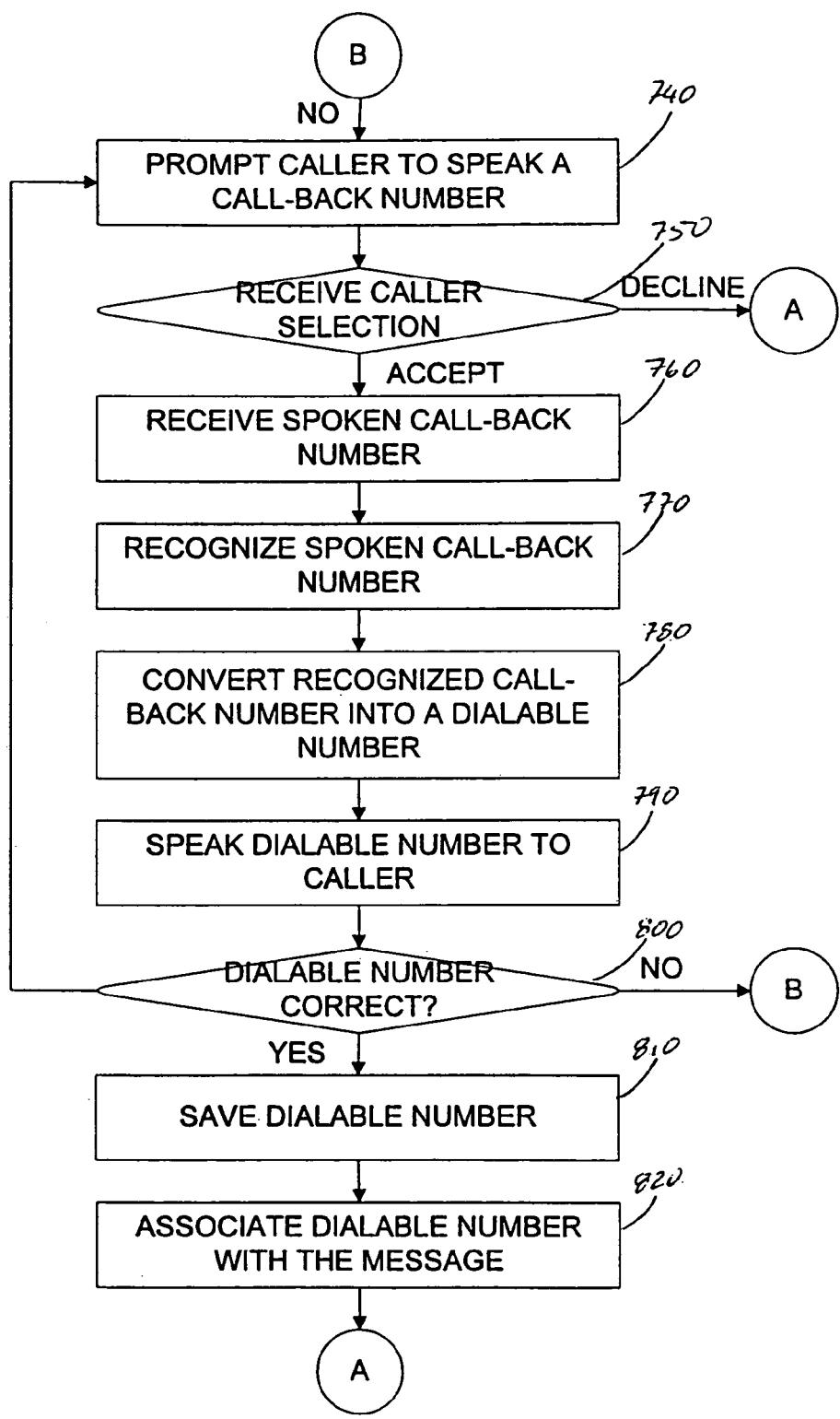

FIGS. 4A and 4B illustrate flowcharts of another embodiment of the present invention.

Initially an incoming telephone call arrives for a particular telephone extension line, step 600. As discussed above, the incoming call is typically an internal telephone call or an external telephone call.

In response to the incoming telephone call, signal processor 200 sends ringing signals to the particular telephone extension, step 610. If the particular telephone extension is answered, step 620, the incoming telephone call is connected to the particular extension, step 630. If the particular telephone extension is not answered within a predetermined amount of time, step 640, the incoming call is transferred to a voice mail extension, step 650. In the present embodiment, the voice mail system is treated as an internal telephone extension line and rings at least once before the incoming call is answered by the voice mail system.

Initially, the voice mail system outputs instructions to the caller and typically prompts to the caller for instructions, step 660. Instructions to the caller typically include how to leave a message, how to transfer to an operator, how to bypass the instructions menu, and the like. If the caller inputs instructions, step 670, the instructions are processed by the voice mail system, step 680. In the present embodiment, instructions take the form of DTMF tones in response to the caller pressing buttons on a numeric keypad. In alternative embodiments, other forms of caller input may include spoken instructions, and the like.

In the present embodiment, in the default mode, if no instructions are received from the caller, the caller is typically prompted to leave a voice mail message, step 685. Next, telephone server 70 then receives the desired message, step 690. In other embodiments of the present invention, the message need not be a voice message, and may be a facsimile transmission, a data transmission, and the like.

In the present embodiment, the message is compressed using a conventional pulse coded modulation scheme, and then stored into memory storage 110, step 700. In alternative embodiments other types of compression schemes may be used to advantageously reduce the amount of data required by a message, although simple ".wav"-type formats can also be used.

Typically, telephone server 70 stops recording when telephone server 70 determines that the caller has hung up or when the caller presses a particular telephone keypad key or combinations of keys, step 710. In the present embodiment, if the caller has not terminated the call, the caller can review the message before sending the message, step 720. The caller may then re-record the message or accept the message, step 730. When the message is accepted, the message is saved.

In the present embodiment, after the message is saved, a message instructing the caller to speak a call-back number is output, step 740. Typically, the call-back number is a telephone number or other number that the caller leaves in the voice mail system, as described above. If the caller does not want to leave a call-back number, the caller may decline leaving a number, step 750.

Next, the caller orally speaks the call-back number, step 760. The call-back number may be in any appropriate form, as illustrated in the examples above. In response to the spoken call-back number, a conventional voice recognition algorithms is used to recognize the spoken words or characters, as illustrated in the examples above, step 770. Alternative embodiments may include multiple voice recognition algorithms for different languages and/or different cultural accents.

Next, the recognized words or characters are translated into a dialable telephone number, step 780, as also described above. The dialable telephone number is typically repeated to the caller, step 790. In the present embodiment, this typically includes the step of translating each number in the dialable number into a spoken number. The voice files used for reading back the dialable number are typically stored in memory storage 110.

If the dialable telephone number has not been correctly captured by telephone server 70, step 800, the above capture process may be repeated, if desired. In the present embodiment, if the dialable number is correct, the dialable number is stored in memory storage 110, step 810 and associated with the message, step 820. The caller is typically prompted for further instructions.

In alternative embodiments of the present invention, the process of leaving a message and leaving the call-back number may be combined into one step. For example, telephone server 70 may prompt the caller to first leave a call-back number and after that leave a message. In such a case, the voice recognition algorithm would first process the initial part of the message to determine whether there is a call-back number, and if so, to recognize the call-back number. The initial part may, for example be the first 10 seconds of the message, and the like. Further, in such an embodiment, after the message is complete, the recognized call-back number, or the dialable call-back number may be repeated to the caller. In another example, the telephone server 70 may instruct the caller to first leave a message and before the caller completes the message, leave a call-back number. Again, the voice recognition algorithm may be used to recognize the call-back number within the message. For example, the last 15 seconds of the message may be passed to the voice recognition algorithm for to determine the caller call-back number.

In still another embodiment, the telephone number may be stated in other locations within the message. In such a case, the voice recognition algorithm would monitor the message for a call-back number, and if and when the call-back number were found buried within the message, the telephone number would be recognized.

CONCLUSION

In the foregoing specification, the invention has been described with reference to specific exemplary embodiments thereof. Many changes or modifications are readily envisioned. For example, embodiments supporting different formats for telephone call-back numbers are contemplated for different countries. Further, other types of localization are foreseeable in international versions of the present invention.

Other embodiments of the present invention may include combinations, sub-combinations, and or additions to the above disclosed embodiment. As an example, translation of the recognized telephone number into a dialable number need not be performed. As another example, the voice recognition algorithm may be embodied for operation within processor 90, within signal processor 200, or split between the processors.

In yet another embodiment, using conventional analog caller identification signals such as Caller ID, the telephone number of the caller can automatically e captured. If the caller declines to speak a call-back number, the telephone number automatically captured may be used as the call-back number. If the user speaks a call-back number in this embodiment, the spoken call-back number is used instead of the Caller ID signal. Such embodiments would be useful when the caller is calling from a pay phone, or the like.

The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for operating a telecommunications server, the method comprising:
   receiving a spoken call back number from a user;
   analyzing the spoken call back number to determine if the spoken call back number is a dialable call back number, the dialable call back number including numbers that connect to a telephone extension corresponding to the spoken call back number when dialed;
   if the spoken call back number is not a dialable call back number, determining a dialable call back number from the spoken call back number, the determined dialable call back number being different from spoken call back number, the determined dialable call back number including numbers that connect to a telephone extension corresponding to the spoken call back number when dialed; and
   associating the dialable call back number to a message associated with the user, the associated dialable call back number enabling the telecommunications server to automatically call back the user using the dialable call back number.

2. The method of claim 1, further comprising:
   providing the message to a second user;
   receiving a request from the second user to make a return call to the user; and
   dialing the dialable call back number in response to the request.

3. The method of claim 1, wherein analyzing the spoken call back number comprising determining if numbers should be added or subtracted from numbers corresponding to the spoken call back number.

4. The method of claim 3, wherein determining the dialable call back number comprises adding or subtracting numbers from the numbers corresponding to the spoken call back number.

5. The method of claim 1, wherein analyzing the spoken call back number comprises determining that non-numeric spoken characters or words should be translated into numbers.

6. The method of claim 5, wherein determining the dialable call back number comprises translating the non-numeric spoken characters or words into numbers.

7. The method of claim 1, wherein the message comprises at least one of a spoken message, a data transmission, and a fax transmission.

8. A computer program product having a plurality of instructions adapted to direct a telecommunications server to perform a set of steps comprising:
  receiving a spoken call back number from a user;
  analyzing the spoken call back number to determine if the spoken call back number is a dialable call back number, the dialable call back number including numbers that connect to a telephone extension corresponding to the spoken call back number when dialed;
  if the spoken call back number is not a dialable call back number, determining a dialable call back number from the spoken call back number, the determined dialable call back number being different from spoken call back number, the determined dialable call back number including numbers that connect to a telephone extension corresponding to the spoken call back number when dialed; and
  associating the dialable call back number to a message associated with the user, the associated dialable call back number enabling the telecommunications server to automatically call back the user using the dialable call back number.

9. The computer program product of claim 8, further comprising:
  providing the message to a second user;
  receiving a request from the second user to make a return call to the user; and
  dialing the dialable call back number in response to the request.

10. The computer program product of claim 8, wherein analyzing the spoken call back number comprising determining if numbers should be added or subtracted from numbers corresponding to the spoken call back number.

11. The computer program product of claim 10, wherein determining the dialable call back number comprises adding or subtracting numbers from the numbers corresponding to the spoken call back number.

12. The computer program product of claim 8, wherein analyzing the spoken call back number comprises determining that non-numeric spoken characters or words should be translated into numbers.

13. The computer program product of claim 12, wherein determining the dialable call back number comprises translating the non-numeric spoken characters or words into numbers.

14. The computer program product of claim 8, wherein the message comprises at least one of a spoken message, a data transmission, and a fax transmission.

15. A telecommunications server comprising:
  instructions for receiving a spoken call back number from a user;
  instructions for analyzing the spoken call back number to determine if the spoken call back number is a dialable call back number, the dialable call back number including numbers that connect to a telephone extension corresponding to the spoken call back number when dialed;
  if the spoken call back number is not a dialable call back number, instructions for determining a dialable call back number from the spoken call back number, the determined dialable call back number being different from spoken call back number, the determined dialable call back number including numbers that connect to a telephone extension corresponding to the spoken call back number when dialed; and
  instructions for associating the dialable call back number to a message associated with the user, the associated dialable call back number enabling the telecommunications server to automatically call back the user using the dialable call back number.

16. The telecommunications server of claim 15, further comprising:
  instructions for providing the message to a second user;
  instructions for receiving a request from the second user to make a return call to the user; and
  instructions for dialing the dialable call back number in response to the request.

17. The telecommunications server of claim 15, wherein the instructions for analyzing the spoken call back number comprising instructions for determining if numbers should be added or subtracted from numbers corresponding to the spoken call back number.

18. The telecommunications server of claim 17, wherein the instructions for determining the dialable call back number comprises instructions for adding or subtracting numbers from the numbers corresponding to the spoken call back number.

19. The telecommunications server of claim 15, wherein the instructions for analyzing the spoken call back number comprises determining that non-numeric spoken characters or words should be translated into numbers.

20. The telecommunications server of claim 19, wherein the instructions for determining the dialable call back number comprises instructions for translating the non-numeric spoken characters or words into numbers.

21. The telecommunications server of claim 15, wherein the message comprises at least one of a spoken message, a data transmission, and a fax transmission.

* * * * *